3,148,176
PURIFICATION OF POLYMERIZED ALPHA-
OLEFINS
Omar O. Juveland, South Holland, Ill., Wayne E. Smith, Hammond, Ind., and Edwin F. Peters, Lansing, Ill., assignors to Standard Oil Company, Chicago, Ill., a corporation of Indiana
No Drawing. Filed Mar. 15, 1961, Ser. No. 95,826
9 Claims. (Cl. 260—88.2)

This invention relates to polymerization and more particularly relates to a novel method for improving the recovery of high molecular weight polymeric materials from solution polymerization processes. The invention is especially concerned with the removal of metal contaminants from polymeric products.

During recent years, a number of processes have developed for the conversion of alpha-olefins to highly polymerized hydrocarbons employing catalyst systems comprising transition metal halides of Groups 4a–6a of the Periodic Table together with various reducing agents such as the metals of the first to third group of the Periodic Table, hydrides or organometallic compounds thereof. Highly effective catalyst systems of this type consist, for example, of mixtures of titanium tetrachloride and aluminum trialkyl compounds, by means of which solid polyethylene of high molecular weight can be prepared. Other aluminum compounds having an aluminum to carbon bond are equally effective, e.g. dialkylaluminum halides, aluminum sesquihalides, etc. Metal oxides of Groups 5a and 6a of the Periodic Table, for example chromia, molybdena, vanadia, etc. advantageously supported on an inert supporting medium such as silica, silica alumina and the like, particularly when employed together with aluminum hydrocarbon co-catalysts, are effective polymerization catalysts for the preparation of high molecular weight polymers and copolymers of alpha-olefins.

In general, the polymerization processes employing these catalyst systems are effected in the presence of an inert reaction medium, for example in saturated aliphatic hydrocarbons which have been substantially freed of oxygen-containing compounds. Depending upon the polymerization temperatures employed, as well as the solubility characteristics of the particular polymers prepared, the polymerization reaction effluent may comprise a slurry of solid polymer in the inert reaction medium or a solution of polymer therein.

At the conclusion of the polymerization reaction, the reaction mixture is treated by suitable means known in the art for removal of catalyst residues and for recovery of polymer, desirably free of metallic contaminants. It is known, for example, to treat solid polymer slurries prepared by polymerization of alpha-olefins at temperatures in the vicinity of about 90–100° C. in the presence of metal halide-aluminum alkyl catalysts with catalyst deactivators such as alcohol or acetone to destroy catalyst complexes, and then to separate the polymer from the inert reaction medium and subsequently treat the polymer with aqueous or alcoholic acid to remove residual metal contaminants. In the event that supported metal oxides are employed as catalysts, it is advantageous to filter the hot polymer solution to remove solid catalyst, and to subject the filtered solution to various similar techniques for polymer purification.

In accordance with the present invention, we have found that polyolefins produced by the aforesaid techniques employing catalyst consisting of at least in part hydrocarbon aluminum compounds may be advantageously freed of metallic contaminants by treating the polymer in solution in a hydrocarbon solvent with a cellulosic material prior to the deactivation of the polymerization catalyst. While we do not desire to be bound by any theory as to why cellulose is so effective, we believe that residual aluminum hydrocarbon compounds and/or complexes formed by reaction of the aluminum hydrocarbon compound with the transition metal compound, react with the cellulose, thus converting these materials into solids which are readily removed by simple liquid-solid separation techniques. We have found that the process of our invention is effective in removing materials which, upon conventional deactivation as by treatment with alcohol, acetone or aqueous acid are converted into metal contaminants of a form difficult to remove by prior art processes. Additionally, we have found that pretreatment of the reaction mixture with cellulose prior to any catalyst deactivation step permits easy and rapid filtration of the treated reaction mixture through cellulosic filter media such as filter-paper, which are commonly employed in laboratory and commercial filtration.

The process of our invention is applicable to the treatment of polymers prepared in the presence of catalysts formed by mixing a reducible metal compound with an aluminum hydrocarbon compound having reducing properties, for example organo-aluminum compounds such as aluminum dialkyls or diaryls or aluminum trialkyls or aryls. Specific examples of such aluminum compounds include aluminum triethyl, aluminum trimethyl, aluminum triisopropyl, aluminum triisobutyl, aluminum triphenyl, aluminum diethyl bromide, aluminum diethylchloride, aluminum diphenylbromide, aluminum diphenylchloride, ethyl aluminum dihydride, diethyl aluminum hydride, and ethoxy aluminum diethyl. In general, these aluminum compounds have the general formula

where R and R' are members selected from the group consisting of hydrogen, alkyl radicals and aryl radicals, at least one R group being hydrocarbon, and X is a member selected from the group consisting of hydrogen, halogen atoms, alkoxy radicals, aryloxy radicals, secondary amino radicals, secondary acid amide radicals, mercapto radicals, thiophenol radicals, radicals of carboxylic acids or radicals of sulfonic acids. The reducible metal compound is generally one of a transition metal of Groups 4a–6a of the periodic system of elements. Examples of such elements include titanium, zirconium, thorium, hafnium, uranium, vanadium, columbium, tantalum, chromium, molybdenum and tungsten. Examples of compounds of these metals which may be used include halides, such as chlorides or bromides, oxy halides such as oxychlorides, freshly precipitated oxides or hydroxides, organic compounds such as alcoholates, acetates, benzoates or acetylacetonates. The most commonly used salts are those of titanium, zirconium, thorium, uranium and chromium. Titanium salts are particularly useful, such as titanium chlorides, paricularly titanium trichloride and titanium tetrachloride, titanium oxychloride or titanium acetylacetonate.

As reducible metal compounds there may be used oxides of metals of Group 5a and/or 6a of the Periodic Table, advantageously extended on inert supporting materials, such as difficultly reducible metal oxides, for example silica, alumina (preferably the gamma form), magnesia, titania, zirconia, various clays, etc.

Typical polymerization catalyst systems of the aforementioned type have been described in the art, e.g. U.S. Patent 2,824,089 and Belgian Patent 533,362.

The invention can be employed for the treatment of polymerization reaction mixtures obtained in the polymerization of any olefinic hydrocarbon and particularly alpha-olefins containing from 2–10 carbon atoms such as ethylene, propylene, butene-1, pentene-1, hexene-1, decene-1 and the like, and is particularly applicable to purifying polymers of ethylene and propylene and copolymers thereof with higher 1-olefins, such as ethylene-propylene, ethylene-butene, propylene-butene-1, etc. and copolymers of the aforesaid alpha-olefins with other polymerizable materials, such as isobutylene, t-butyl ethylene, butadiene, isoprene and the like. The polymer may also be derived from the polymerization of monomeric materials such as aryl substituted monoolefins, e.g. styrene, ortho-, meta-, para-methylstyrene, dimethylstyrene, indene, allyl benzene, etc., or of monomeric polyolefinic hydrocarbons, including conjugated diolefins such as butadiene-1,3, isoprene, piperylene, dimethyl butadiene, cyclopentadiene, etc.

The inert reaction medium which can be employed for effecting polymerization can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature. Aromatic hydrocarbons such as benzene, toluene, xylene or the like, or halogenated aromatic compounds such as chlorobenzene, chloronaphthalene, etc., can be employed. The nature of the vehicle is subject to considerable variation. Although the vehicle employed should be liquid under the conditions of reaction and relatively inert. The hydrocarbon liquids are desirably employed. Other solvents which can be used include ethylbenzene, isopropylbenzene, ethyltoluene, n-propylbenzene, n-pentane, n-octane, isooctane, methyl cyclohexane and any of the other well-known inert liquid hydrocarbons.

Any type of cellulose or solid cellulose-like material can be used in practicing the process of the present invention, such as wood or plant products, e.g. wood cellulose or cotton. Hemicellulose such as xylan, polysaccharides such as chitin or carbohydrates such as starch are also effective. We prefer to employ cellulose in commonly available form, such as paper pulp or cotton linters. Particularly suitable are the various grades of commercially available cellulosic filter pulp such as Sargent Ash Free Analytical Filter Pulp. The cellulosic material should be free of moisture.

The beneficial advantages of the present process are achieved by admixing the aforesaid cellulosic material, in an amount of from about 1 to about 50, preferably 5 to 25 parts by weight per part of hydrocarbon aluminum compound, with the polymerization reaction mixture containing dissolved hydrocarbon polymer in association with a polymerization catalyst consisting at least in part of a hydrocarbon aluminum compound. In the event the polymerization reaction mixture to be treated comprises a suspension or slurry of polymer, the mixture is heated and/or diluted with additional suitable solvent to completely dissolve the polymer. Advantageously, solutions of about 1 to about 40 weight percent hydrocarbon polymer, preferably from about 1 to 10 weight percent, in solvent are employed. It will be appreciated that the concentration of the polymer solution will be dependent, in part, upon the particular polymer treated, both as to chemical structure and molecular weight. Extremely viscous solutions should be avoided because of inherent difficulty in manipulative processes, e.g. pumping, filtration, etc.

Generally, the polymer solutions are treated by admixing with the cellulosic medium at elevated temperature for a short period of time, sufficient to effect efficient contact of the solution with the solid treating agent. Preferably treatment is effected at temperatures between about 100° C. and about 200° C.; generally contact periods of five minutes to about one hour are sufficient. The polymer solution to be treated can be contacted with the cellulosic material in continuous manner, as by passage through packed columns, or beds of cellulose, pumping through filter means having a cellulosic pre-coat, etc.

As examples of the efficacy of cellulose in removal of metallic contaminants and improving the filtration rates of polymer-containing solution, the following examples are given.

*Example 1*

2.0 liters of cyclohexane was added to a one-gallon stirred autoclave at room temperature. After heating to 140° C., a mixture of gases consisting of 43 weight percent ethylene and 57 weight percent butene-1 was added in sufficient quantity to attain a pressure of 1000 p.s.i.g. When equilibrium was reached, 1.6 g. of aluminum triisobutyl and 1.0 g. of a 5% chromia-on-silica catalyst were added to the reactor. To ensure a constant ethylene/butene-1 ratio, ethylene and butene-1 were added at their rates of consumption throughout the polymerization. After three hours polymerization, the reactor contents were flashed into a 10-liter stirred dilution vessel where the polymer solution was diluted with cyclohexane at 190° C. in sufficient quantity to obtain approximately a 5% polymer solution. After stirring in the dilution vessel at 190° C. for 0.5 hour, the polymer solution was filtered through a filter paper (Shriver and Company, No. 928 thickness=0.035 in.). The filtration rate was very slow. The filtrate was cooled to room temperature and 5 volumes of acetone per volume of filtrate added. The precipitated polymer was filtered and dried. A yield of 188 g. was obtained. The ash content of the polymer was 0.08 weight percent. A molded pellet of the polymer was green, as evidence of $Cr_2O_3$ in the polymer. Theoretical ash of the polymer, assuming no hydrocarbon aluminum catalyst removal by filtration, is 0.75 weight percent. Therefore 11% of the total catalyst still remained in the polymer by this filtration method; moreover, the polymer was colored.

*Example 2*

2.0 liters of cyclohexane was added to a one-gallon stirred autoclave at room temperature. After heating to 140° C., a mixture of gases containing 25 weight percent ethylene and 75 weight percent butene-1 was added in sufficient quantity to attain a pressure of 1000 p.s.i.g. When equilibrium was reached, 2.2 g. aluminum triisobutyl and 1.9 g. of a 5% chromia-on-silica catalyst were added to the reactor. To ensure a constant ethylene/butene-1 ratio in the reactor, ethylene and butene-1 were added at their rates of consumption throughout the polymerization. After three hours polymerization, the reactor contents were flashed into a 10-liter stirred dilution vessel where the polymer solution was diluted with cyclohexane at 190° C. in sufficient quantity to obtain approximately a 5% polymer solution. The dilution vessel contained 20 g. cellulose (Sargent Ash Free Analytical Filter Pulp). The polymer solution was stirred with the cellulose material for 0.5 hour and filtration started through filter paper (Shriver and Company, No. 928; thickness= 0.035 in.). The filtration rate was very rapid—much more rapid than observed in the previous example where cellulose was not used. After filtration and cooling to room temperature, 5 volumes of acetone per volume of filtrate were added. The precipitated polymer was dried. A yield of 134 g. of polymer was obtained. A molded pellet was white. The ash content was only 0.01 weight percent. Theoretical ash assuming no aluminum triisobutyl removal is 1.84 weight percent. Therefore, only 0.54% of the total catalyst remained in the polymer after the filtration method. 99.5% of the catalyst has been removed to yield a clean color-free product.

*Example 3*

2.0 liters of cyclohexane was added to a one-gallon stirred autoclave at room temperature. After heating to 152° C., a mixture of gases containing 45 weight percent ethylene and 55 weight percent propylene was added in sufficient quantity to attain a pressure of 1000 p.s.i.g. When equilibrium was reached, 2.8 g. of aluminum triisobutyl and 2.0 g. of a 5% chromia-on-silica catalyst were added to the reactor, these monomers were added at their rates of consumption throughout the run. After 0.5 hour polymerization, the reactor contents were filtered directly through a sperry filter heated at 160° C. As the filter bed, a filter paper (Shriver and Company; No. 928; thickness=0.035 in.) precoated with 20 g. of cellulose (Sargent Ash Free Analytical Filter Pulp) was used. The polymer solution filtered at a fast rate and a white molded pellet was obtained from the dried polymer. The polymer had an ash content of 0.02 weight percent indicating that 99-plus percent of the catalyst had been removed by this filtration method.

When inorganic filter aids, such as celite, clays such as Bentonite or Attapalgus clay, or silica gel are substituted for the cellulose precoat employed in this example, filtration rates are much slower and the recovered polymer is more highly colored.

*Example 4*

2.0 liters of cyclohexane was added to a one-gallon stirred autoclave at room temperature. After heating to 150° C., ethylene was added to 150 p.s.i.g. When equilibrium was reached, 1.2 g. aluminum triethyl and 0.5 g. titanium tetrachloride were added to the reactor. After 0.8 hour polymerization at 150 p.s.i.g., the reactor contents were flashed into a 10-liter stirred dilution vessel where the polymer solution was diluted with cyclohexane at 190° C. in sufficient quantity to obtain approximately a 5% polymer solution. The dilution vessel contained 20 g. cellulose (Sargent Ash Free Analytical Filter Pulp). The polymer solution was stirred with the cellulose material for 0.5 hour and filtration started through filter paper (Shriver and Company, No. 928; thickness=0.035 in.). The filtration rate was excellent. After filtration and cooling to room temperature, five volumes of acetone per volume of filtrate was added. A yield of 85 g. solid polymer was obtained having a density of 0.941 g./cc. and an intrinsic viscosity of 6.0 dl./g. In spite of the high molecular weight, a 5% solution of this polymer filtered readily. When the polymer solution is filtered prior to the cellulose treatment, filtration rates are very slow and high pressure is required.

*Example 5*

2.0 liters of cyclohexane was added to a 1-gallon stirred autoclave at room temperature. After heating to 160° C., ethylene was added to 150 p.s.i.g. When equilibrium was reached, 0.75 g. aluminum triisobutyl and 0.17 g. vanadium oxytrichloride were added to the reactor. After 0.5 hour polymerization at 150 p.s.i.g., the reactor contents were flashed into a 10-liter stirred dilution vessel where the polymer solution was diluted wtih cyclohexane at 190° C. in sufficient quantity to obtain approximately a 5% polymer solution. The dilution vessel contained 20 g. cellulose (Sargent Ash Free Analytical Filter Pulp). The polymer solution was stirred with the cellulose material for 0.5 hour and filtration started through filter paper (Shriver and Company, No. 928; thickness=0.035 in.). The filtration rate was good. After filtration and cooling to room temperature, 5 volumes of acetone per volume of filtrate was added. A yield of 144 g. solid polymer was obtained having a density of 0.962 g./cc. and an intrinsic viscosity of 5.5 dl./g. In spite of the high molecular weight, the 5% solution of the polymer which had been treated with cellulose filtered readily.

We claim:

1. A method of removing a soluble aluminum hydrocarbon compound from a polymerization reaction mixture, which method comprises intimately contacting a liquid polymerization reaction mixture comprising an inert solvent and a polymer dissolved therein, derived from polymerizing a low molecular weight alpha-olefin monomer in the presence of a catalyst comprising an aluminum hydrocarbon compound, with a reagent consisting essentially of a cellulosic material substantially free of moisture for a period of time sufficient to insolubilize said aluminum compound, separating therefrom insoluble material and a liquid polymer-solvent phase, and thereafter recovering from said phase product polymer characterized by a low content of ash resulting from said aluminum compound.

2. The process of claim 1 wherein said reaction mixture contains from about 1 to about 40 weight percent polymer.

3. The process of claim 1 wherein the amount of cellulosic material used is from about 1 to about 50 parts per part of aluminum hydrocarbon compound.

4. The process of claim 1 wherein the cellulosic material is paper pulp.

5. The process of claim 1 wherein said reaction mixture is treated by heating to a temperature between about 100° C. and about 200° C. to effect complete solution of said hydrocarbon polymer therein.

6. A method of removing ash-forming aluminum compounds from a hydrocarbon polymer, which method comprises treating a hydrocarbon polymer reaction mixture containing a dissolved aluminum hydrocarbon compound to effect complete solution of said polymer therein, said mixture resulting from polymerizing at least one alpha-olefin monomer in an inert hydrocarbon solvent in the presence of a catalyst comprising a compound of a metal of Groups 4a to 6a of the Periodic Table and an aluminum hydrocarbon compound, intimately contacting said mixture with a reagent consisting essentially of a cellulosic material substantially free of moisture for a period of time sufficient to insolubilize said aluminum hydrocarbon compound, thereafter separating solids from said mixture while maintaining said polymer in solution in said solvent, and recovering therefrom a solid polymer characterized by a low content of ash resulting from said aluminum hydrocarbon compound.

7. Process of claim 6 wherein said hydrocarbon polymer is a copolymer of ethylene and propylene and said catalyst is made by combining chromia on an inert support and aluminum triisobutyl.

8. Process of claim 6 wherein said hydrocarbon polymer is polyethylene and said catalyst is made by combining titanium tetrachloride and aluminum triethyl.

9. Process of claim 6 wherein said hydrocarbon polymer is polyethylene and said catalyst is made by combining vanadium oxychloride with aluminum triisobutyl.

References Cited in the file of this patent

UNITED STATES PATENTS

| | | |
|---|---|---|
| 2,849,429 | Cines | Aug. 26, 1958 |
| 2,858,902 | Cottle | Nov. 4, 1958 |
| 3,070,589 | Kirch | Dec. 25, 1962 |

OTHER REFERENCES

Perry: "Chemical Engineers' Handbook," 3rd edition, McGraw-Hill, pages 967–970.